United States Patent [19]

Smith et al.

[11] Patent Number: 4,562,981
[45] Date of Patent: Jan. 7, 1986

[54] PARACHUTE AND HANG GLIDER SAFETY DEVICE

[76] Inventors: David S. Smith; Geoffrey A. Smith, both of Unit 7, 189 Coode St., South Perth, Western Australia, Australia, 6151

[21] Appl. No.: 505,937

[22] Filed: Jun. 20, 1983

[30] Foreign Application Priority Data

Jun. 24, 1982 [AU] Australia ................................ PF4582
Sep. 20, 1982 [AU] Australia ................................ PF5963

[51] Int. Cl.$^4$ ............................................ B64D 17/02
[52] U.S. Cl. ..................................... 244/146; 244/145
[58] Field of Search ......................... 244/145, 146, 142

[56] References Cited

U.S. PATENT DOCUMENTS

| | | | |
|---|---|---|---|
| 1,810,488 | 6/1931 | Lehmann | 244/146 |
| 1,835,656 | 12/1931 | Lehmann | 244/146 |
| 1,840,618 | 1/1932 | Castner | 244/146 |
| 1,905,298 | 4/1933 | McDaniel | 244/146 |
| 3,420,478 | 1/1969 | Ferguson | 244/145 |
| 4,355,774 | 10/1982 | Koenig | 244/145 |

FOREIGN PATENT DOCUMENTS

| | | | |
|---|---|---|---|
| 425038 | 5/1911 | France | 244/146 |
| 109496 | 9/1917 | United Kingdom | 244/146 |

*Primary Examiner*—Galen L. Barefoot
*Assistant Examiner*—Rodney Corl
*Attorney, Agent, or Firm*—Dennison, Meserole, Pollack & Scheiner

[57] ABSTRACT

A parachute assembly includes a canopy, a harness connected to the canopy by lines, the canopy having an apex and a basal perimeter. Envelopes in the canopy defined by a plurality of generally triangular inflatable gussets extend from adjacent the apex to adjacent the basal perimeter and taper outwardly towards the basal perimeter. The assembly includes a source of pressurized gas and flexible conduits connecting the gas source to the gussets. One or more valves for releasing the gas from the source through the conduits to the inflatable envelopes and manually operable valves to release the pressurized gas into the conduits and envelopes to inflate the gussets.

9 Claims, 6 Drawing Figures

PARACHUTE AND HANG GLIDER SAFETY DEVICE

The present invention relates to personal aerial buoyancy devices particularly parachutes and hang gliders.

In accordance with one aspect of the present invention there is provided a parachute assembly comprising a canopy, a harness connected to the canopy by lines, the canopy having an apex and a basal perimeter, envelope means in the canopy in the form of a plurality of generally triangular inflatable gussets which extend from adjacent the apex to adjacent the basal perimeter and taper outwardly towards the basal perimeter or in the form of a single overall gusset extending over the area of the canopy between the apex and the basal perimeter, the assembly also comprising a source of pressurised gas, flexible conduit means connecting the said source to the gussets, valve means for releasing the gas from said source into the conduit means and manually operable means for opening the valve means to release the pressurised gas into the conduit means so as to inflate the envelope means.

In accordance with a further aspect of the present invention there is provided a hang glider assembly comprising a rigid framework, a harness connected to the framework, and a pair of wings extending laterally on either side of the framework, wherein each wing contains an envelope means comprising an inflatable panel extending longitudinally of the wing, the assembly also comprising a source of pressurised gas, conduit means connecting the said source to the inflatable panels, valve means for releasing the gas from said source into the conduit means and manually operable means for opening the valve means to release the pressurised gas into the conduit means so as to inflate the envelope means.

Satisfactory results are obtained in the present invention if the gas is air or a gas of a similar density to air. However, better results are obtained with the use of a lighter-than-air gas such as helium. Nevertheless, a gas such as air may be able to inflate the envelope means to an extent sufficient for it, for example, to adopt its normal configuration and slow down the descent of the user. The valve means is manually operable so that gas can be released from the source of pressurised gas by the user of the personal aerial buoyancy device as required.

The present invention will now be described, by way of example, with reference to the accompanying drawings, in which.

Figure 1:
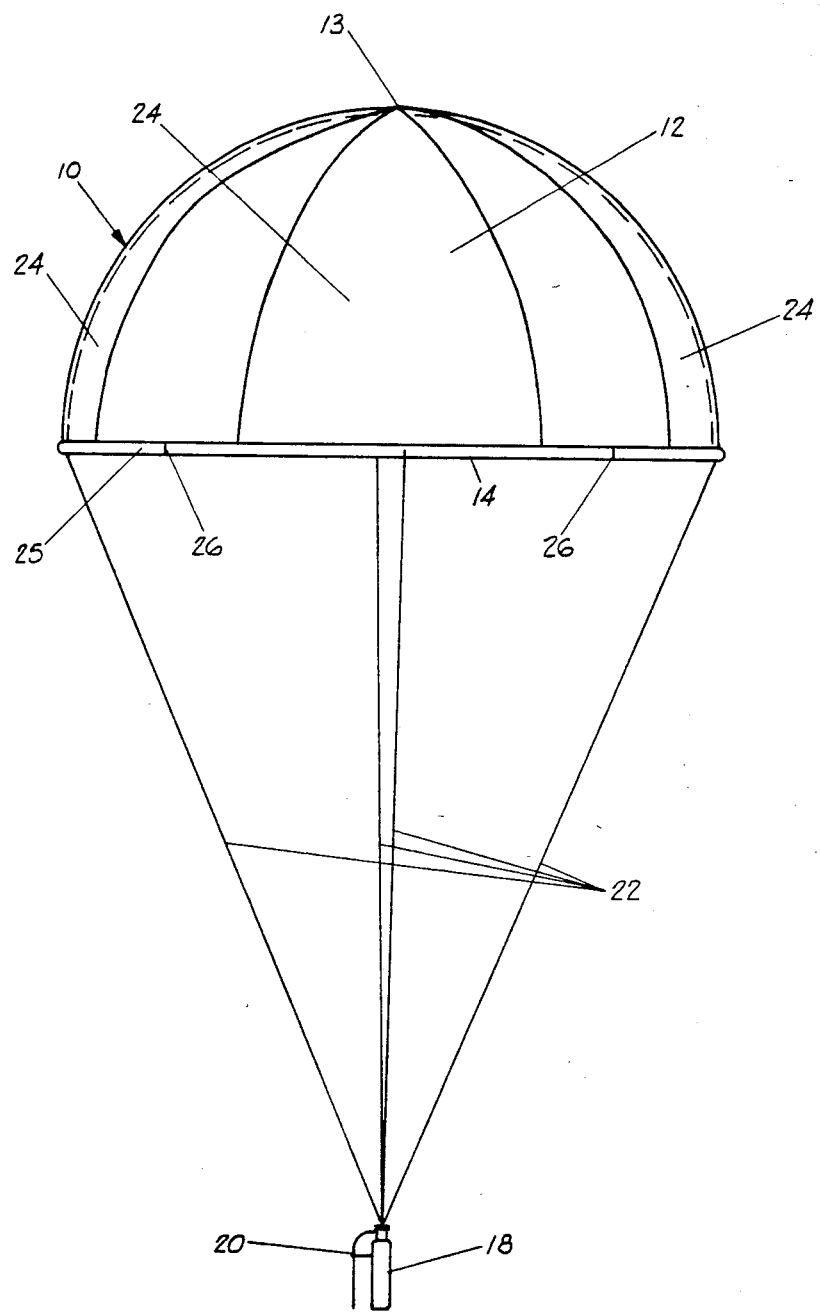
FIG. 1 is a schematic side elevation of a parachute assembly in accordance with the present invention.
Figure 2:
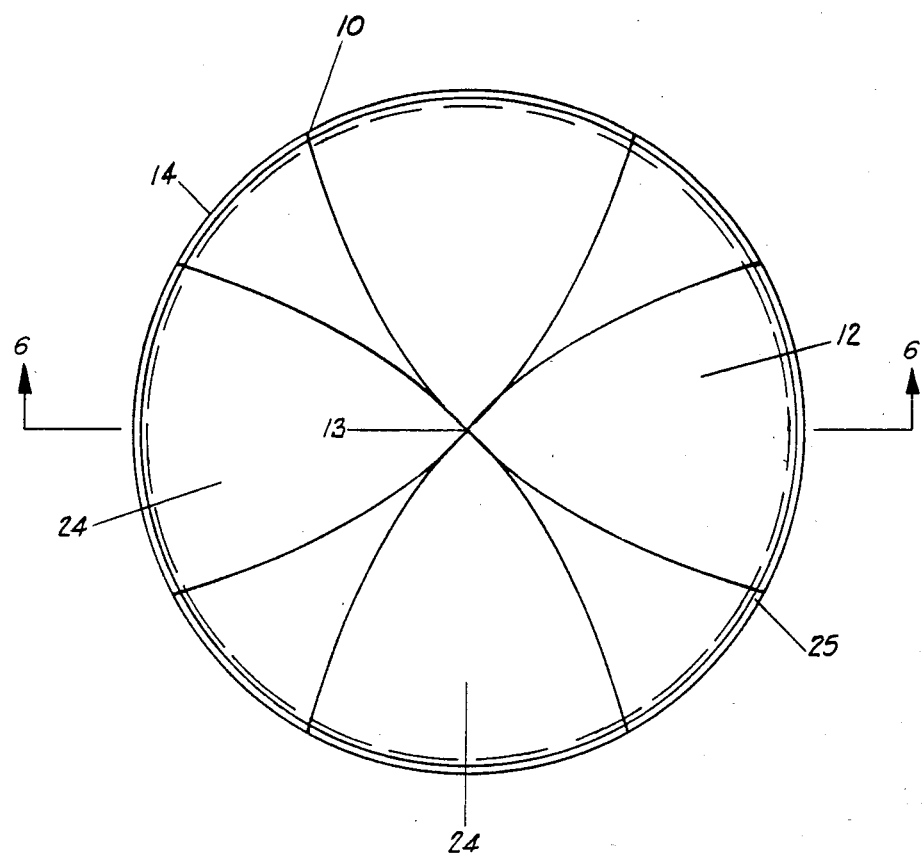
FIG. 2 is a plan view of the parachute assembly of FIG. 1.

In FIG. 1, there is shown a parachute assembly 10 comprising a canopy 12 and a harness (not shown), and lines (not shown) connecting the harness and the canopy 12. The harness and lines are of conventional type. The canopy 12 comprises an apex 13 and a basal perimeter 14.

The assembly 10 also comprises a parachute safety inflation fitting comprising a container 18 such as a cylinder made of metal or other pressure resistant material. The container 18 may be approximately 300 mm long by 100 mm in diameter and is capable of storing gas or a mixture of gases which may be lighter than air and preferably non-flammable, an example being helium. However, as described hereinabove the container 18 could contain air or a gas with a density similar to that of air. The gas could be a mixture of air with one or more other gases.

In the top of the container 18 are located four quick release pressure valves. These valves are controlled by a manually operable actuating lever 20 attached to the side of the cylinder.

The lever 20, when actuated, allows an even gas flow from each valve. Attached to each of these four valves is a respective high pressure tube 22 made of reinforced nylon or other suitable pressure resistant material. The said tubes connect to four inflatable gussets 24 (only three of which can be seen in FIG. 1) spaced evenly in the canopy 12 of the parachute. The gussets 24 are located internally of the canopy 12 and form an envelope means. The gussets 24 are made of material capable of withstanding high pressure and each is effectively sealed to prevent leakage when inflated. As shown, the gussets 24 extend from a point adjacent the apex of the canopy 12 to a point adjacent the basal perimeter 14. The gussets 24 are of generally triangular shape. The tubes 22 connecting the gas container 18 to the gussets 24 in the parachute 10 are preferably sufficiently flexible to be included amongst the support lines extending from the parachute canopy 12 to the harness. Further, the tubes 22 need to be sufficiently long for the container 18 to be within reach of a user of the parachute 10 so that, in use, the lever 20 can be manually operated as required.

In addition to the gussets 24, the canopy 12 may include as envelope means an inflatable annular panel 25 extending in a strip around the basal perimeter 14 of the canopy 12. The panel 25 would assist the canopy 12 in opening rapidly. The panel 25 is arranged to be in communication with the gussets 24 by any suitable means when the canopy 12 is inflated as described hereinafter. For example, the strip gusset 25 could be subdivided into a number of sections each corresponding with a respective gusset 24 by means of dividers 26. A respective section of the strip gusset 25 is inflated from the corresponding gusset 24, in use, and for this purpose a passage or the like may be provided between the gusset 24 and section of the gusset 25 to permit gaseous communication between them.

Figure 6:
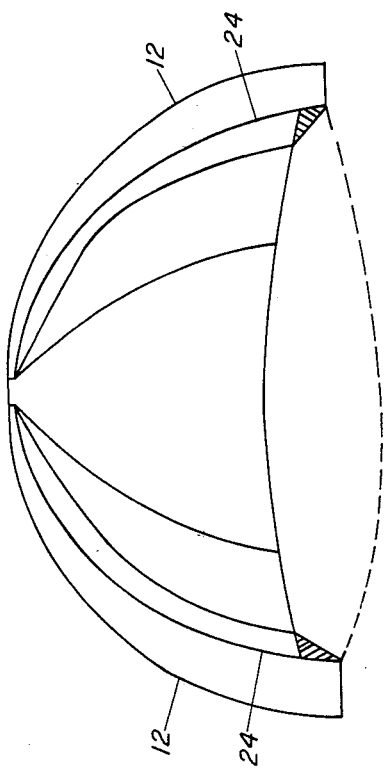
FIG. 6 is a sectional view, not drawn to scale, taken along section line 6—6 of FIG. 2.

The envelope means can take any suitable form providing that it is capable of being inflated by gas in the container 18 and is of a configuration, when so inflated, to cause the canopy 12 to open out. For example, it is preferred to that the aggregate length of the bases of the triangular gussets 24 adjacent the basal perimeter 14 of the canopy 12, be between about 50% and about 75% of the length of the basal perimeter. For example, a parachute of 28 feet diameter has a basal perimeter of about 88 feet. In this case four gussets 24 may each have a base of 15 feet in length to give an aggregate length of 60 feet, i.e. about 68% of the length of the basal perimeter 14. In a parachute of 35 feet diameter, having a basal perimeter 14 of about 110 feet, the four gussets 24 may each have a base of 18 feet in length. This gives an aggregate base length of 72 feet which is about 65% of the length of the basal perimeter 14. Further, in a typical canopy, the gussets 24 may vary in depth between about 3 inches and 9 inches adjacent the apex 13 of the canopy 12 such as about 6 inches and about 1 foot and 2 feet such as about 18 inches adjacent the basal perimeter 14. Such a gusset 24 varying in depth is shown in cross-section in FIG. 6.

The present invention is designed to operate in an emergency situation when the parachute either fails to open properly or becomes tangled. The wearer of the parachute 10 may have the aforementioned cylinder 18 attached to his body in an extension of the parachute harness. Immediately an emergency occurs he depresses the actuating lever 20 on the side of the cylinder 18. This action immediately releases high pressure gas evenly through the four valves on top of the cylinder 18 into the connecting tubes 22 and thence into the four gussets 24 and the panel 25, if present, sewn into the canopy of the parachute thus slowing the descent and causing the parachute to either open properly, or by inflating the gussets 24 and the panel 25, if present, sufficiently to cause the landing to be relatively normal as regards impact.

This apparatus is designed to obviate the need for a reserve parachute.

The gusset panels can be attached to the canopy by any convenient means such as stitching and/or heat sealing. The means used is not critical as long as an inflatable gusset is obtained. The gussets have been described as being located internally of the canopy but they could equally well be located externally of the canopy.

The four gussets 24 described could be replaced by, for example, 2, 3 or 5 gussets. Also, the four valves connected to individual tubes 22 could be replaced by any equivalent assembly which would achieve rapid inflation of the envelope means, such as a single valve connected to a single conduit with branches to each part of the envelope means. As an alternative to the use of a plurality of generally triangular gussets, a single overall gusset extending over, for example, the entire external area of the canopy 12 between the apex 13 and the basal perimeter 14 could be used.

The use of gussets in accordance with the present invention, as opposed to tubes, has the advantage that the panels forming the gussets have less bulk than tubes when packing. That is, the panels forming the gussets can be formed of relatively thin material which material may be of comparable type and thickness to the material of the canopy. Thus, the gussets of the present invention provide little or no impediment to packing. This is important since parachutists normally pack their own parachute and it is preferable that they be able to pack their parachute in the manner to which they are accustomed.

The parachute assembly shown in the drawings is a diagrammatic representation of one form of parachute and it should be understood that there are many other forms of parachutes to which the present invention can be applied.

In particular, it is considered that an overall gusset configuration would be more appropriate for a modern sporting and service parachute which tends to have the canopy arranged in rectangular sections.

Further, inflation of the gussets would have the added advantage that the canopy would tend to float on water if the parachutist landed in water. This would reduce the possibility of the canopy dragging the parachutist underwater.

Figure 3:
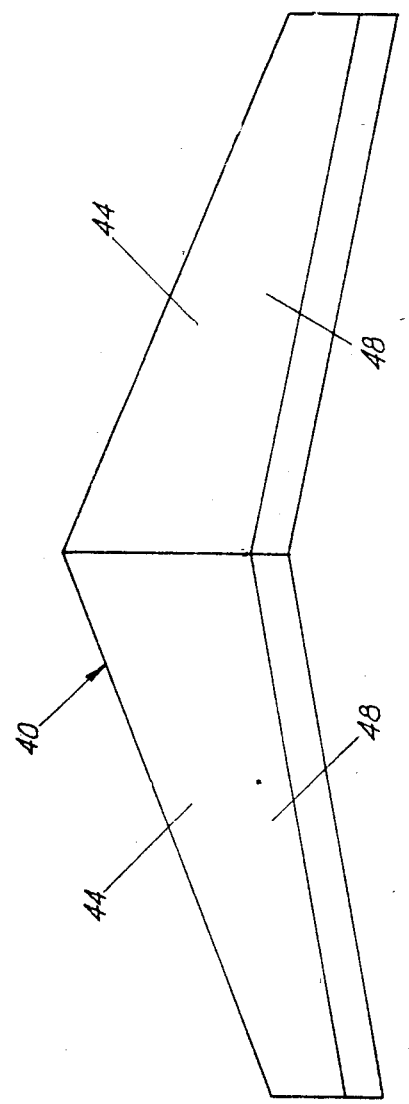
FIG. 3 is a plan view of a hang glider in accordance with the present invention.
Figure 4:
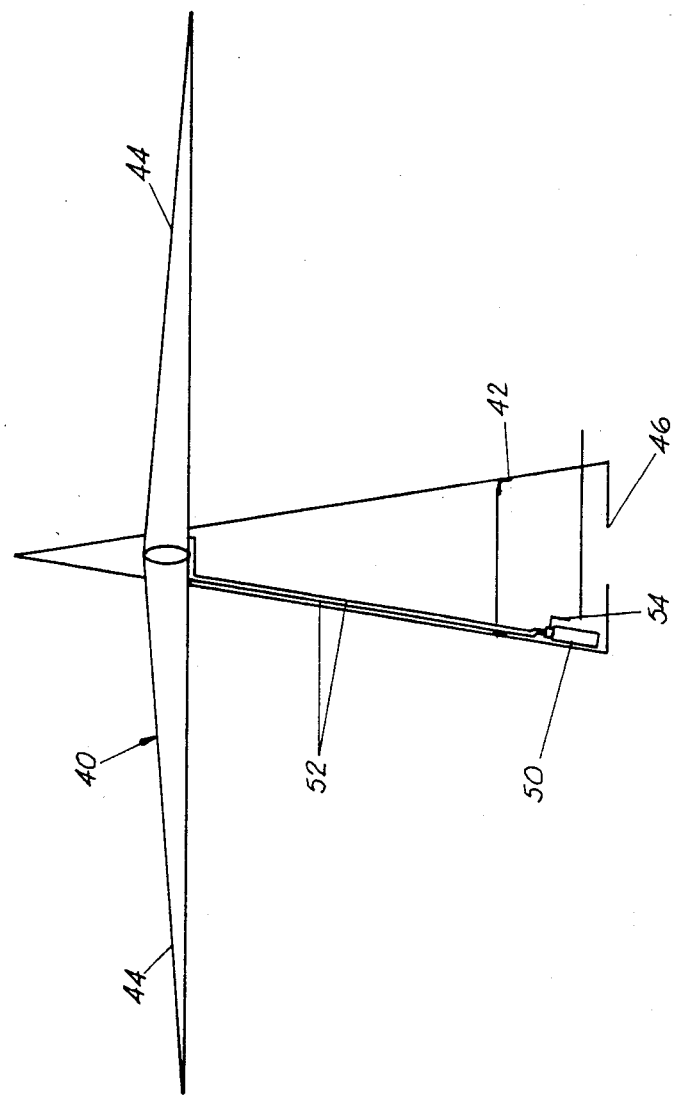
FIG. 4 is a rear elevation of the hang glider of FIG. 3.
Figure 5:
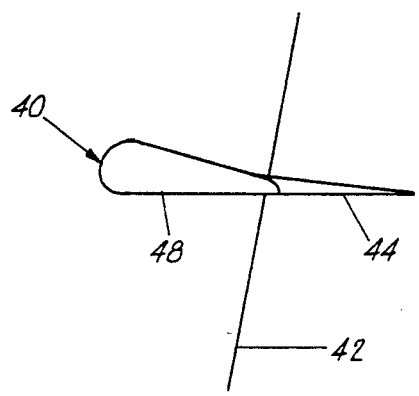
FIG. 5 is a side elevation of the hang glider of FIG. 3.

In FIGS. 3 to 5, there is shown a hang glider 40 comprising a rigid metal framework 42. A pair of flexible wings 44 extend laterally of the framework 42 on either side thereof.

The framework 42 comprises a harness 46 adjacent its lower end. The harness 46 is arranged in use to support a person in the framework 42.

Each wing 44 contains a respective inflatable panel 48. The inflatable panels 48 form an envelope means.

Further, a container 50 is mounted in the framework 42 adjacent the harness 46 or is attached to the pilot. The container 50 contains gas under pressure in similar manner to the container 18 described above. A pair of conduits 52, which are preferably flexible, lead from the container 50. Each conduit leads to a respective one of the panels 48. The container 50 also has a manually operable release means in the form of a lever 54 and a valve means arranged to be opened by the lever 54. The container 50 could contain a respective valve for each conduit 52 and the lever 54 could conveniently be arranged to open each valve simultaneously.

In use, as with the parachute assembly described above, the user of the hang glider 40 can move the lever 54 to release gas through the valve means and conduits 52 into the panels 48.

The panels 48 could extend over the entire area of each wing 44 or several spaced inflatable panels could be located in each wing 44. Clearly, the disposition of the panels in each wing would have to correspond with the disposition in the other wing to ensure maintenance of the aerodynamic configuration in use.

The safety device of the present invention is designed to be used in emergencies where the hang glider has lost its aerodynamic configuration or where it has lost lift for other reasons such as because of wind shear or other wind disturbances. The actuation of the lever 54 causes the gas to enter the panels 48 and inflate them so restoring the aerodynamic configuration of the glider at least partially, at the same time slowing the descent and possibly enabling the user to gain control.

Also, the device of the present invention could be used to enhance hang glider flight by inflating the panels 48 either prior to or during flight to provide additional lift and enable the user to execute movement that would otherwise not be possible.

The hang glider shown in the drawings is a diagrammatic representation of one form of hang gliders and it should be understood that there are many other forms of hang gliders to which the present invention can be applied.

Modifications and variations such as would be apparent to a skilled addressee are deemed within the scope of the present invention. For example the gas container could have a gauge to show the volume of the stored gas.

We claim:

1. A parachute assembly comprising a canopy having an apex and a basal perimeter, a harness connected to the canopy by lines, a plurality of generally triangular gussets each joined to a surface of said canopy so as to define one of a plurality of generally triangular, selectively inflatable envelope means, each envelope means and gusset extending from adjacent said apex to adjacent said basal perimeter and tapering outwardly toward said basal perimeter, the assembly further including a source of pressurized gas, a plurality of flexible conduit means each connecting said source to an envelope means, valve means for releasing the gas from said source into the conduit means and manually operable means for opening the valve means to release the pressurized gas into the conduit means to inflate the envelope means.

2. A parachute assembly according to claim 1, wherein the gussets are all of similar size and shape and are spaced evenly about the canopy.

3. A parachute assembly according to claim 2, which comprises from 2 to 5 of the generally triangular gussets.

4. A parachute assembly according to claim 2, in which the ends of the gussets adjacent the basal perimeter of the canopy are of an aggregate length between about 50 and about 75% of the length of the basal perimeter.

5. A parachute assembly according to claim 2, in which the envelope means have an inflated depth of from about 3 to about 9 inches adjacent the apex of the canopy and from about 1 foot to about 2 feet adjacent the basal perimeter of the canopy.

6. The parachute assembly according to claim 1, in which the source of pressurised gas contains a gas which is lighter than air.

7. A parachute assembly according to claim 6, in which the gas is helium.

8. A parachute assembly according to claim 1, in which the source of pressurised gas is a container having a plurality of outlet valves each connected to a respective flexible conduit, said outlet valves being controlled by a single release means so that in use there is an even gas flow from each valve.

9. A parachute assembly according to claim 1, in which the envelope means comprises an additional inflatable annular panel extending adjacent the basal perimeter of the canopy and in gaseous communication with the envelope means.

* * * * *